United States Patent
Gresset et al.

(10) Patent No.: US 7,715,805 B2
(45) Date of Patent: May 11, 2010

(54) METHOD FOR TRANSMITTING DATA IN A MIMO TELECOMMUNICATION SYSTEM OFFERING A HIGH DIVERSITY AS PERCEIVED FROM A RECEIVER END

(75) Inventors: Nicolas Gresset, Rennes Cedex (FR); Loic Brunel, Rennes Cedex (FR); Joseph Boutros, Paris (FR)

(73) Assignees: Mitsubishi Electric Information Technology Center Europe B.V., NS Schiphol Rijk (NL); Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/569,805

(22) PCT Filed: Jul. 9, 2004

(86) PCT No.: PCT/EP2004/007701
§ 371 (c)(1),
(2), (4) Date: Oct. 18, 2006

(87) PCT Pub. No.: WO2005/022816
PCT Pub. Date: Mar. 10, 2005

(65) Prior Publication Data
US 2007/0275668 A1 Nov. 29, 2007

(30) Foreign Application Priority Data
Aug. 29, 2003 (EP) .................................. 03292129

(51) Int. Cl.
*H03C 7/02* (2006.01)

(52) U.S. Cl. ...................... 455/101; 375/267; 375/299; 455/69; 455/103

(58) Field of Classification Search .................. None
See application file for complete search history.

(56) References Cited

U.S. PATENT DOCUMENTS 6,700,926 B1 * 3/2004 Heikkila et al. ............. 375/221

(Continued)

OTHER PUBLICATIONS

IEEE published documents in 2000 by Klang et al : Transmit diversity based on Space-time block codes in frequency selective Rayleigh fading DS-CDMA system ( applicant submitted IDS).*

(Continued)

*Primary Examiner*—Duc Nguyen
*Assistant Examiner*—Zhiyu Lu
(74) *Attorney, Agent, or Firm*—Oblon, Spivak, McClelland, Maier & Neustadt, L.L.P.

(57) ABSTRACT

The present invention relates to a method for transmitting data between a transmitter provided with at least two transmitting antennas (ta1, ta2 . . . taNt) and a receiver. The method according to the invention further includes a symbol spreading step in the course of which components Zij (for i=I to S and j=I to Nt) of a predetermined number of successive symbols ZI . . . ZS are to be spread over time before being transmitted over said transmitting antennas (ta1, ta2 . . . taNt). The data transmitted at any given moment will thus not be representative of a single symbol Zi (for i=1 to S), as is the case in known MIMO systems, but will represent a mixture between Nt components of S successive symbols, which introduces data diversity with respect to time as perceived at the receiver end.

12 Claims, 5 Drawing Sheets

U.S. PATENT DOCUMENTS

| | | | |
|---|---|---|---|
| 7,050,510 B2 * | 5/2006 | Foschini et al. | 375/299 |
| 2004/0120274 A1 * | 6/2004 | Petre et al. | 370/320 |
| 2005/0226313 A1 * | 10/2005 | Castelain et al. | 375/146 |
| 2006/0135081 A1 * | 6/2006 | Mysore et al. | 455/70 |

OTHER PUBLICATIONS

IEEE published documents in 2002 by Teng et al :Space-time spreading codes for multiuser MIMO system ( applicant submitted IDS).*

Doostnejad, Roya et al: "Space-Time Spreading Codes for a Multiuser MIMO System", Conference Record of the $36^{th}$. Asilomar Conference on Signals, Systems, & Computers, vol. 1 of 2, pp. 1374-1378, 2002.

Klang, Goran et al: "Transmit Diversity Based on Space-Time Block Codes in Frequency Selective Rayleigh Fading DS-CDMA Systems", Vehicular Technology Conference Proceedings, vol. 1, pp. 264-268, 2000.

Alamouti, Siavash M. "A Simple Transmit Diversity Technique for Wireless communications", IEEE Journal on Selected Areas in Communications, vol. 16 No. 8, pp. 1451-1458, Oct. 1998.

* cited by examiner

METHOD FOR TRANSMITTING DATA IN A MIMO TELECOMMUNICATION SYSTEM OFFERING A HIGH DIVERSITY AS PERCEIVED FROM A RECEIVER END

BACKGROUND OF THE INVENTION

1. Field of the Invention

The present invention relates to a method for transmitting data in a telecommunication system including at least one transmitter provided with at least two transmitting antennas and at least one receiver provided with at least one receiving antenna, which method includes a symbol encoding step for producing symbols to be transmitted over communication channels established between the transmitting and receiving antennas.

2. Discussion of the Background

Telecommunication systems in which a plurality of antennas are used at a receiver end and/or at a transmitter end of a wireless link are called Multiple Input Multiple Output systems (further referred to as MIMO systems). MIMO systems have been shown to offer large transmission capacities compared to those offered by single antenna systems. In particular, MIMO capacity increases linearly with the number of transmitting or receiving antennas, whichever the smallest, for a given Signal-to-Noise Ratio and under favourable uncorrelated channel conditions. MIMO techniques are thus likely to be used in future wireless systems intended to provide large spectral efficiencies or, alternatively, reduce the transmitting power required for obtaining a spectral efficiency equivalent to that which is obtained in current telecommunication systems. Such MIMO techniques will very likely be combined with multi-carrier modulation techniques like OFDM (standing for Orthogonal Frequency Division Multiplex) and MC-CDMA (standing for MultiCarrier-Code Division Multiple Access) techniques, whose use in future wireless systems is also considered.

A particular type of MIMO systems makes use of a Bit Interleaved Coded Modulation technique, further referred to as BICM, according to which the transmitter includes a channel encoder intended to apply an encoding, e.g. by means of a convolutional code or of a turbo code, to uncoded data bits, and to provide a binary stream to an interleaver. This interleaver will then deliver permutated bits, which are to be divided into word sequences intended to be transformed into a series of coded symbols featuring each a plurality of components, the components of a same symbol being intended to be transmitted during a same time chip by respective transmitting antennas.

Transmitted symbols are to be decoded on the receiver end, which is usually performed in MIMO systems of the BICM type by means of an iterative space-time decoder, which decoder is intended to produce estimates of coded bits constituting the transmitted symbols. The spatial diversity induced by the use of multiple transmitting and receiving antennas eases such a decoding, since this diversity provides a larger amount of information than that which would be provided by a single signal transmitted through a single communication channel.

BRIEF SUMMARY OF THE INVENTION

The inventors have observed that increasing the diversity of input data perceived by a front-end detector included in a space-time decoder enables said decoder to converge more quickly towards reliable estimates of the coded bits on the basis of which said data has been generated. This may be construed as obtaining better decoding performance by feeding the decoder with data having a higher quality, i.e. a richer content.

The spatial diversity perceived by the receiving antennas, which is obtained by using multiple communication channels, though producing the above-mentioned advantages, is limited by the number of receiving antennas, which in turn limits the performance of the space-time decoder.

The invention aims at solving the aforementioned problem, by providing a method for transmitting data in a MIMO system, which method involves an encoding scheme enabling to provide a high data diversity, with respect to both space and time, as perceived by at least one receiving antenna at the receiver end of such a telecommunication system.

Indeed, a method according to the opening paragraph is characterized according to the invention in that it further includes a symbol spreading step in the course of which components of a predetermined number of successive symbols are to be spread over time before being transmitted over said communication channels.

The invention enables to compound the spatial diversity obtained by the use of multiple communication channels established between the transmitting and receiving antennas with a diversity with respect to time of the data perceived by the receiving antennas.

According to a possible embodiment of the invention, the symbol spreading step is performed by computing a plurality of linear combinations of components of a vector representative of said successive symbols, said linear combinations being intended to be transmitted by means of the transmitting antennas over a number of time chips equal to the predetermined number of successive symbols.

The data transmitted over the multiple communication channels at any given moment will thus not be representative of a single symbol, as is the case in the known MIMO systems described above, but will represent a mixture between components of successive symbols, which thus introduces diversity with respect to time.

According to a specific embodiment of the invention, the symbol spreading step is performed by multiplying a vector formed by a concatenation of components of each of said successive symbols, on the one hand, with a predefined spreading matrix, on the other hand.

This specific embodiment of the invention is quite easy to implement, and thus enables to obtain an increased diversity at a relatively low cost in terms of computing resources and processing power required at the transmitting end, which is an important issue in the field of mobile communications where the transmitter may be constituted by a mobile terminal such as a mobile phone, which has to be as small as possible and will be power-fed by a battery having a limited energy storage capacity.

The nature of the predefined spreading matrix may be chosen on the basis of prior knowledge of, or on the basis of assumptions pertaining to the communication channels to be established between the transmitting and receiving antennas.

According to a first variant of the specific embodiment described above, the spreading matrix is constructed in such a way that each of its rows is formed by successive chunks having each a size corresponding to the number of transmitting antennas, all chunks of any given row forming respective vectors having all a same norm.

A spreading matrix according to this first variant enables an essentially homogeneous distribution over time of energy carried by the symbols transmitted through ergodic communication channels and ensures optimal detectability of changes in the communication conditions from one time chip to another. This in turn enables to provide a high diversity with respect to time and space of the data as perceived by receiving antennas at the receiver end of such ergodic communication channels.

According to a second variant of the specific embodiment described above, the spreading matrix is constructed in such a way that each of its rows is formed by successive chunks having each a size corresponding to the number of transmitting antennas, all chunks of any given row forming respective vectors having all a same norm and being orthogonal to each other.

Thanks to the orthogonality between chunks, a spreading matrix according to this second variant enables to add ergodicity to essentially invariant channels, during the time interval needed for transmitting the linear combinations of all components of the predetermined number of successive symbols, and additionally provides an essentially homogeneous distribution over this time interval of the energy carried by the symbols transmitted through said communication channels, which ensures optimal detectability of changes in the communication conditions from one time chip to another. This in turn enables to provide a high diversity with respect to time and space of the data as perceived by receiving antennas at the receiver end of such essentially invariant communication channels.

According to a third variant of the specific embodiment described above, the spreading matrix is constructed in such a way that each of its rows is constituted by a plurality of segments forming respective vectors having all a same norm, each segment including successive chunks having each a size corresponding to the number of transmitting antennas, all chunks of any given segment forming respective vectors having all a same norm and being orthogonal to each other.

A spreading matrix according to this third variant is particularly well-suited to so-called block-fading communication channels, which are expected to feature C successive sets of communication conditions over the whole duration of the transmission of the components of a predetermined number S of successive symbols, each set of communication conditions of said block-fading channels being thus essentially invariant during S/C time chips.

The orthogonality between all chunks of a same segment enables to add ergodicity to the block-fading channels during each invariance period defined by these S/C time chips, the equality of the norms of said chunks additionally providing an essentially homogeneous distribution over each invariance period of the energy carried by the symbols transmitted during said invariance period through the block-fading channels.

Since the communication conditions within such block-fading channels change from one invariance period to another, block-fading channels may be considered ergodic at the scale of the invariance periods, so that the additional equality of the norms of the segments of each row of the spreading matrix is sufficient to ensure an essentially homogeneous distribution over all successive invariance periods of the energy carried by the symbols transmitted through the block-fading channels.

This in turn enables to provide a high diversity with respect to time and space of the data as perceived by receiving antennas at the receiver end of such block-fading communication channels.

According to a preferred embodiment of the above-described first, second or third variants, the spreading matrix will additionally have the properties of a rotation matrix, i.e. such a spreading matrix will be constituted by rows orthogonal to each other and having a same norm.

The use of a rotation matrix for computing the plurality of linear combinations of components of successive symbols at the transmitter end enables to optimize global performance of the iterative space-time decoder intended to process said symbols at the receiver end, by enhancing the performance of the first iterative step performed by said decoder.

According to one of its hardware-related aspects, the invention also relates to a telecommunication system including at least one transmitter provided with at least two transmitting antennas and at least one receiver provided with at least one receiving antenna, which transmitter includes symbol encoding means for producing symbols to be transmitted over communication channels established between the transmitting and receiving antennas, system characterized in that said transmitter further includes symbol spreading means for spreading over time components of a predetermined number of successive symbols before transmission of said components over said communication channels.

According to a possible embodiment of this hardware-related aspect, the symbol spreading means are intended to compute a plurality of linear combinations of components of a vector representative of said successive symbols, said linear combinations being intended to be transmitted by means of the transmitting antennas over a number of time chips equal to the predetermined number of successive symbols.

According to a specific embodiment of the above-described hardware-related aspect, the symbol spreading means are intended to multiply a vector formed by a concatenation of components of each of said successive symbols, on the one hand, with a predefined spreading matrix, on the other hand.

According to another of its hardware-related aspects, the invention also relates to a communication device provided with at least two transmitting antennas and including symbol encoding means for producing symbols to be transmitted over said transmitting antennas, characterized in that it further includes symbol spreading means for spreading over time components of a predetermined number of successive symbols before transmission of said components over said transmitting antennas.

BRIEF DESCRIPTION OF THE SEVERAL VIEWS OF THE DRAWING(S)

The characteristics of the invention mentioned above, as well as others, will emerge more clearly from a reading of the following description given in relation to the accompanying figures, amongst which:

DETAILED DESCRIPTION OF THE INVENTION

Figure 1:
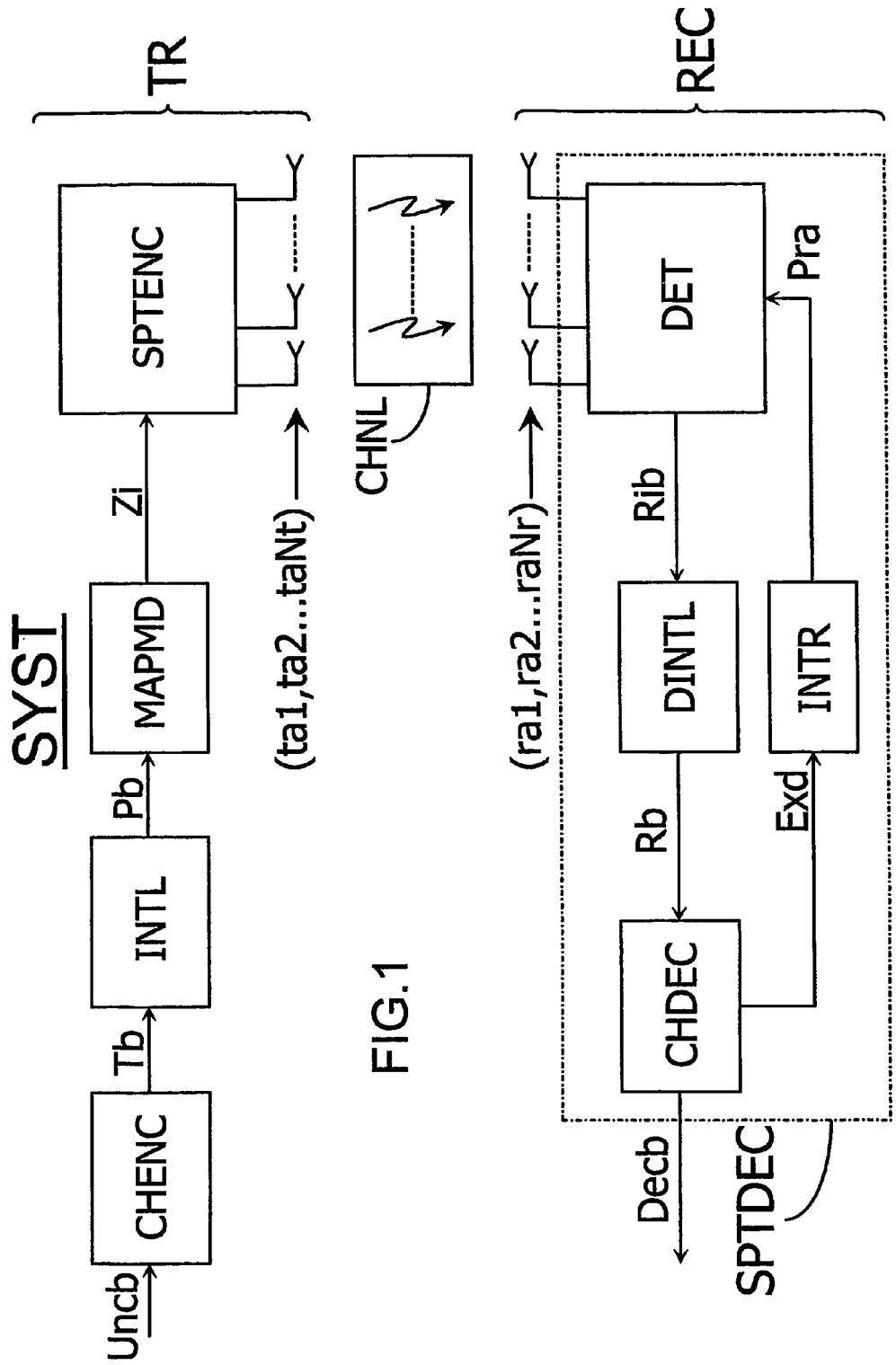
FIG. 1 is a block diagram showing a highly simplified MIMO telecommunication system.

FIG. 1 diagrammatically shows a telecommunication system including at least one transmitter TR and one receiver REC, intended to exchange signals through multiple communication channels CHNL established between Nt transmitting and Nr receiving antennas (ta1,ta2 . . . taNt) and (ra1,ra2 . . . raNr), respectively.

The transmitter TR shown in the example depicted here includes a channel encoder CHENC intended to apply an encoding, e.g. by means of a convolutional code or of a turbo code, to uncoded data bits Uncb, and to provide a binary stream Tb to be transmitted. The transmitter TR includes an interleaver INTL intended to generate permutated bits Pb, such an interleaving being useful for a later processing on the receiver side, since it will allow to obtain uncorrelated data. The permutated bits Pb are then divided into sequences of Nt words of at least one bit each, which word sequences are then mapped, i.e. transformed into a series of coded symbols Zi by a mapping and modulation module MAPMD, each symbol Zi then featuring Nt components. Successive symbols Zi are then fed to symbol encoding means essentially formed by a space-time encoder SPTENC, which performs a processing of said symbols Zi before their transmission.

In the known state of the art, the Nt components of each symbol Zi are intended to be transmitted during a same time chip by respective transmitting antennas taj (for j=1 to Nt).

The receiver REC shown in the example depicted here includes a space-time decoder SPTDEC intended to produce decoded data bits Decb which should ultimately correspond to the originally uncoded data bits Uncb. This space-time decoder SPTDEC includes a space-time detector DET intended to process data carried by signals received by means of the receiving antennas (ra1,ra2 . . . raNr), and to produce likelihood values Rib related to estimates of the transmitted permutated bits Pb, which likelihood values are intended to be de-interleaved by a de-interleaver DINTL which is to output soft likelihood values Rb related to estimates of bits included in the binary stream Tb. A bit decoder included in the receiver REC, further referred to as channel decoder CHDEC, is intended to generate the decoded data bits Decb on the basis of said likelihood values Rb.

According to a loop structure commonly used in the art, the space-time detector DET will male use of a priori information Pra generated in the course of previous decoding steps, and issued in the form of extrinsic information Exd by the channel decoder CHDEC through an interleaver INTR, which interleaver is identical to the interleaver INTL included in the transmitter TR.

The inventors have observed that increasing the diversity of the data perceived by the space-time detector DET enables said decoder to converge more quickly towards reliable estimates of the coded bits on the basis of which said data has been generated. The inventors have thus aimed at increasing the diversity of the data received by the receiving antennas (ra1,ra2 . . . raNr), by compounding the spatial diversity obtained by the use of multiple communication channels CHNL established between the transmitting and receiving antennas (ta1,ta2 . . . taNt) and (ra1,ra2 . . . raNr) with a diversity with respect to time of the data as perceived by receiving antennas at the receiver end of said channels.

Figure 2:
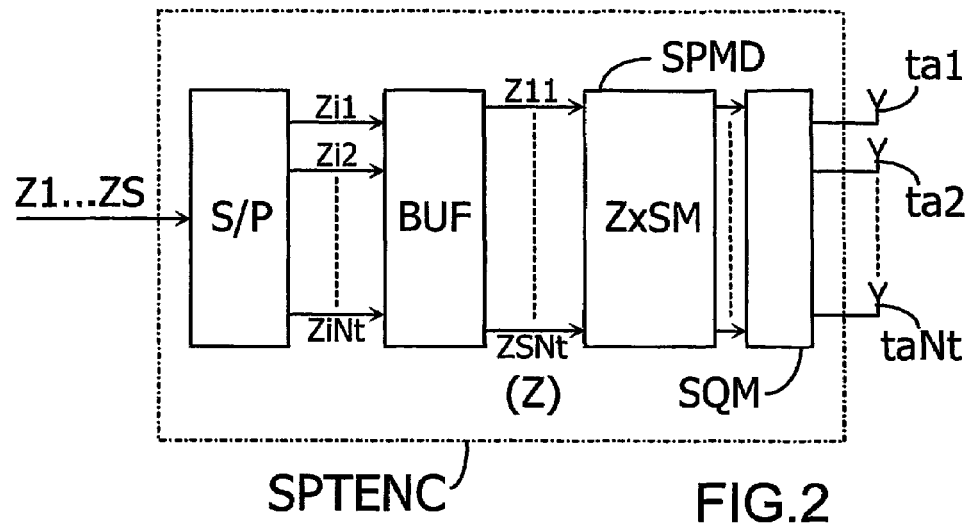
FIG. 2 is a block diagram showing a space-time encoder included in a transmitter included in a MIMO telecommunication system according to the invention.

FIG. 2 diagrammatically shows how such a diversity may be obtained by means of the invention. Indeed, in the example depicted here, the space-time encoder SPTENC includes a series-to-parallel converter S/P intended to successively receive components of S successive symbols Z1 . . . ZS and to deliver S successive parallel sets of Nt components Zi1 . . . ZiNt (for i=1 to S) to a buffer BUF, which is to deliver a single set of S.Nt concatenated components of all successive symbols Z1 . . . ZS to symbol spreading means SPMD. This set of Ns=S.Nt components forms, after concatenation, a symbol vector Z representative of said successive symbols Z1 . . . ZS. The symbol spreading means SPMD are in turn intended to compute Ns linear combinations of the components Zij (for i=1 to S and j=1 to Nt) of the symbol vector Z, said linear combinations being intended to be sequenced into S successive sets of Nt components by a sequencing means SQM before being transmitted by the Nt transmitting antennas (ta1, ta2 . . . taNt) over a number of time chips equal to the predetermined number S of successive symbols Z1 . . . ZS whose components are involved in said linear combinations.

The data transmitted at any given moment over the multiple communication channels established between said transmitting antennas (ta1,ta2 . . . taNt) and the above-described receiving antennas will thus not be representative of a single symbol Zi (for i=1 to S), as is the case in known MIMO systems, but will represent a mixture between Nt components of S successive symbols, which thus introduces data diversity with respect to time as perceived at the receiver end. Whereas the maximal diversity obtained in known MIMO systems of the type shown in the previous Figure is equal to the number Nr of receiving antennas, the maximal diversity which may be obtained thanks to the invention will thus be equal to S.Nr.

Figure 3:
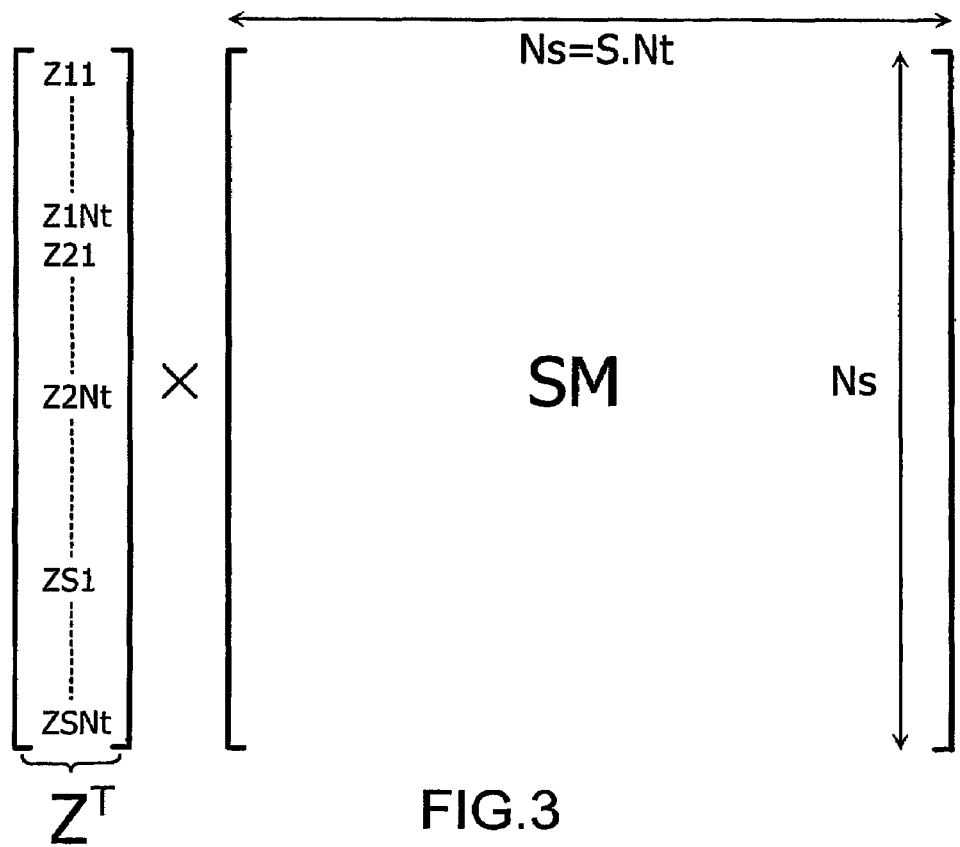
FIG. 3 is a diagram showing how a spreading step according to the invention may be performed within such a space-time encoder.

FIG. 3 depicts how Ns linear combinations of the components Zij (for i=1 to S and j=1 to Nt) of the symbol vector Z, represented here in a transposed form $Z^T$, may be computed by the above-described spreading means. According to a preferred embodiment of the invention, the vector Z formed by a concatenation of all Nt components Zi1 . . . ZiNt (for i=1 to S) of each of said successive symbols Zi is multiplied with a predefined spreading matrix SM having, in this example, a size of Ns×Ns, which enables to produce Ns separate linear combinations of all components Zij (for i=1 to S and j=1 to Nt) of the symbol vector Z, which linear combinations are to be transmitted over Nt transmitting antennas during S successive time chips.

The components Zij (for i=1 to S and j=1 to Nt) of the symbol vector Z may be formed by complex symbols. In such a case, the spreading matrix SM could be of size Ns×Ns and be constituted by complex components. An alternative approach may consist in processing separately the real and imaginary parts of the complex components Zij by means of a spreading matrix SM of size (2.Ns)×(2.Ns) and including only real components. One half of the 2.Ns real linear combinations generated by such a real spreading matrix SM would then correspond to real parts of the complex symbols to be transmitted on the Nt transmitting antennas, while the other half of the 2.Ns real linear combinations generated by the real spreading matrix SM would correspond to imaginary parts of the complex symbols to be transmitted on said Nt transmitting antennas.

The nature of the predefined spreading matrix SM may be chosen on the basis of prior knowledge of, or on the basis of assumptions pertaining to the communication channels to be established between the transmitting and receiving antennas.

Figure 4:
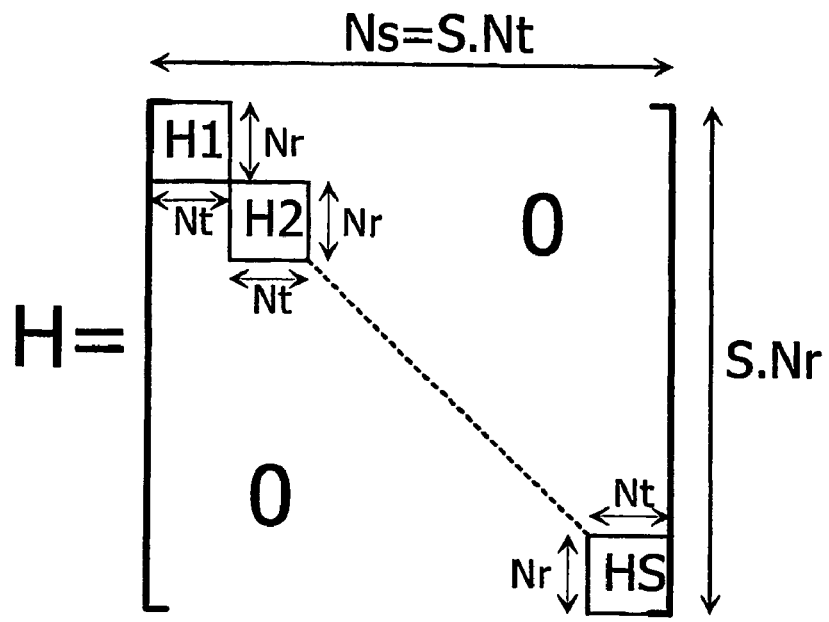
FIG. 4 is a diagram showing a channel matrix associated with ergodic communication channels.

FIG. 4 represents a channel matrix H depicting a situation in which the communication channels are supposed to be ergodic, i.e. the communication conditions within said channels are expected to change for each of the S time chips during which S successive sets of Nt linear combinations of the components Zij (for i=1 to S and j=1 to Nt) of the symbol vector Z are to be transmitted. This is modelized by S different diagonal blocks H1 . . . Hs, each of which having a size of Nt×Nr.

The inventors have found that a high diversity will be obtained if the quantity of data carried by such ergodic communication channels is essentially homogeneous over time. This enables to prevent situations in which a high amount of data is present at a given instant at the output of said communication channels, following which given instant almost no data will be present at said output, which would mean that time-related information will be easily detectable at said given instant and barely detectable afterwards. An essentially homogeneous distribution over time of the energy carried by the symbols transmitted through ergodic communication channels ensures optimal detectability of changes in the communication conditions from one time chip to another, and thus enables to provide a high data diversity with respect to time and space as perceived by receiving antennas at the receiver end of such communication channels.

Figure 5:
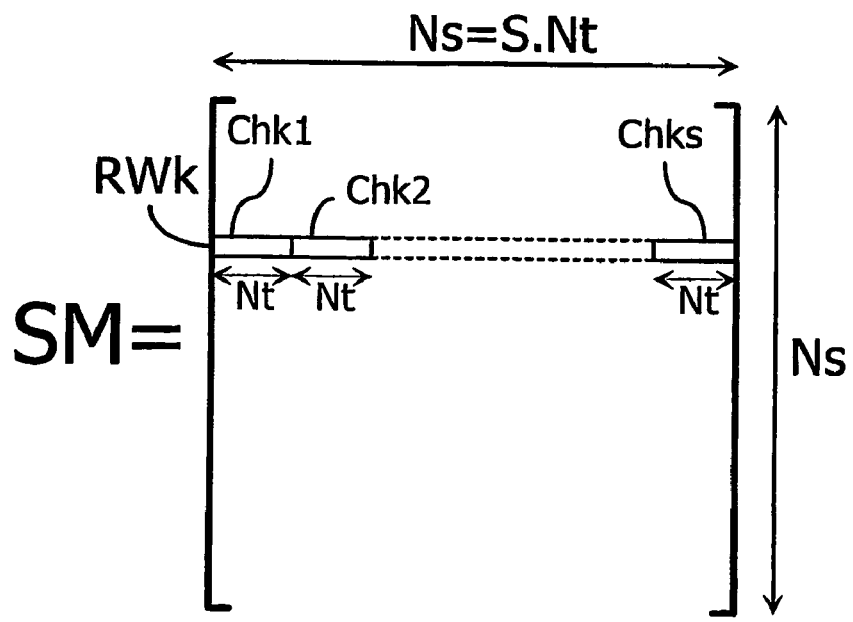
FIG. 5 is a diagram showing a spreading matrix adapted to such ergodic channels.

FIG. 5 depicts a spreading matrix SM according to a first variant of the above-described preferred embodiment of the invention, according to which said spreading matrix SM has a structure specifically adapted to ergodic communication channels. In this example, the spreading matrix SM is constructed in such a way that each of its rows RWk (for k=1 to Ns) is formed by S successive chunks Chk1 ... Chks having each a size corresponding to the number Nt of transmitting antennas, all chunks of any given row forming respective vectors having all a same norm, which enables to obtain the above-described homogeneous distribution of energy carried by the symbols transmitted through ergodic communication channels.

In situations almost opposite to the ergodic case described above, the communication channels may be essentially invariant, i.e. the communication conditions within said channels are expected to remain the same for all of the S time chips during which S successive sets of Nt linear combinations of the components Zij (for i=1 to S and j=1 to Nt) of the symbol vector Z are to be transmitted.

In such a case, no diversity with respect to time will be induced by the communication channels, which may be modelized within the channel matrix H by S identical diagonal blocks in place of the S different blocks H1 ... Hs depicted in FIG. 4.

The inventors have found that a high time-related diversity as perceived by receiving antennas at the receiver end of such essentially invariant channels may be obtained by constructing the spreading matrix in such a way that each of its rows is formed by successive chunks having each a size corresponding to the number of transmitting antennas, all chunks of any given row forming respective vectors having all a same norm and being orthogonal to each other. A spreading matrix according to such a second variant of the above-described preferred embodiment of the invention may thus be represented as the matrix SM shown in FIG. 5, with the added condition that the chunks Chk1 ... Chks of any given row RWk are orthogonal with respect to each other. Such an orthogonality enables to simulate the effect ergodic communication channels would have on transmitted sets of linear combinations of components of successive symbols, and thus may be construed as performing an artificial transformation of essentially invariant channels into ergodic channels during the time interval needed for transmitting all linear combinations of the components of the predetermined number of successive symbols. As explained hereinbefore, the fact that all chunks Chk1 ... Chks of any given row RWk have all a same norm enables to obtain a homogeneous distribution over time of the energy carried by the symbols transmitted through the artificially transformed communication channels.

A possible way of constructing such a spreading matrix consists in selecting, for each given row of this spreading matrix, a given square rotation matrix of dimensions Nt×Nt, with Nt greater than or equal to S, and selecting S rows of this rotation matrix for constituting the S successive chunks of said given row of the spreading matrix according to this second variant of the invention.

Figure 6:
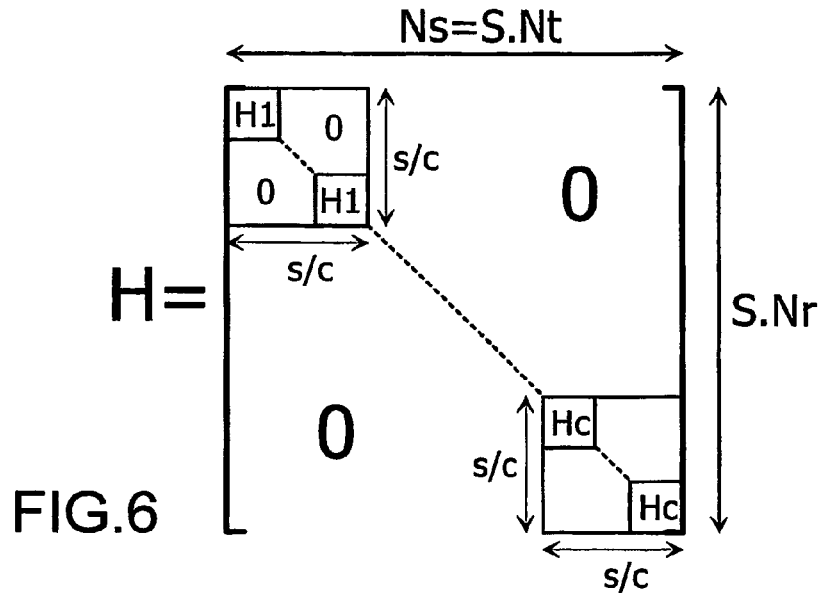
FIG. 6 is a diagram showing a channel matrix associated with block-fading communication channels.
Figure 7:
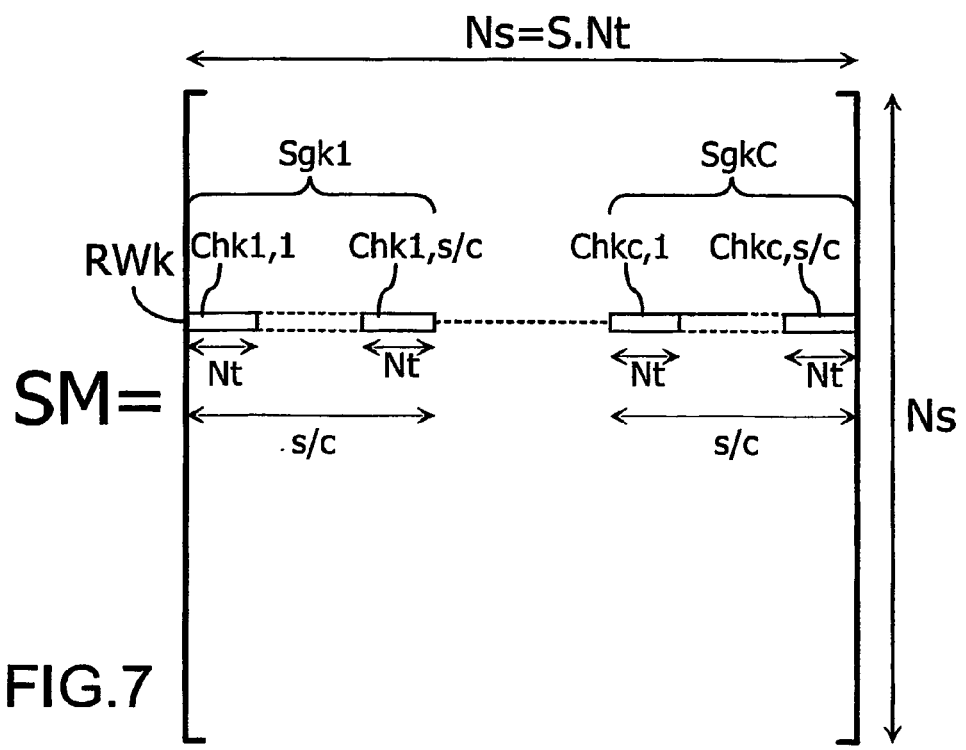
FIG. 7 is a diagram showing a spreading matrix adapted to such block-fading channels.

FIG. 6 represents a channel matrix H depicting a situation in which the communication channels are supposed to be so-called block-fading channels, which are expected to feature C successive sets of communication conditions over the S time chips during which S successive sets of Nt linear combinations of the components Zij (for i=1 to S and j=1 to Nt) of the symbol vector Z are to be transmitted, each set of communication conditions of said block-fading channels being, however, essentially invariant during S/C successive time chips forming an invariance period.

The channel matrix H includes in such a case C different diagonal blocks, each being constituted by S/C identical diagonal sub-blocks, respectively H1 ... Hc, having each a size of Nt×Nr.

According to a third variant of the above-described preferred embodiment of the invention, the spreading matrix SM is constructed in such a way that each of its rows RWk (for k=1 to Ns) is constituted by C segments Sgkn (for n=1 to C) forming respective vectors having all a same norm, each segment Sgkn including successive chunks Chkn,1 ... Chkn,s/c having each a size corresponding to the number of transmitting antennas, all chunks Chkn,1 ... Chkn,s/c of any given segment forming respective vectors having all a same norm and being orthogonal to each other.

The orthogonality between all chunks Chkn,1 ... Chkn,s/c of a same segment Sgkn enables to add ergodicity to the block-fading channels during each invariance period defined by the corresponding S/C time chips, the equality of the norms of said chunks Chkn,1 ... Chkn,s/c additionally providing an essentially homogeneous distribution, over each relevant invariance period, of the energy carried by the symbols transmitted through the block-fading channels during said invariance period. Since the communication conditions within block-fading channels change from one invariance period to another, said channels may be considered ergodic at the scale of the invariance periods, so that the additional equality of the norms of the C segments Sgkn (for n=1 to C) of each row RWk (for k=1 to Ns) of the spreading matrix SM is sufficient to ensure an essentially homogeneous energy distribution over the S time chips during which S successive sets of Nt linear combinations of the components Zij (for i=1 to S and j=1 to Nt) of the symbol vector Z are to be transmitted. This in turn enables to provide a high diversity with respect to time and space of the data as perceived by receiving antennas at the receiver end of such block-fading communication channels.

Figure 8:
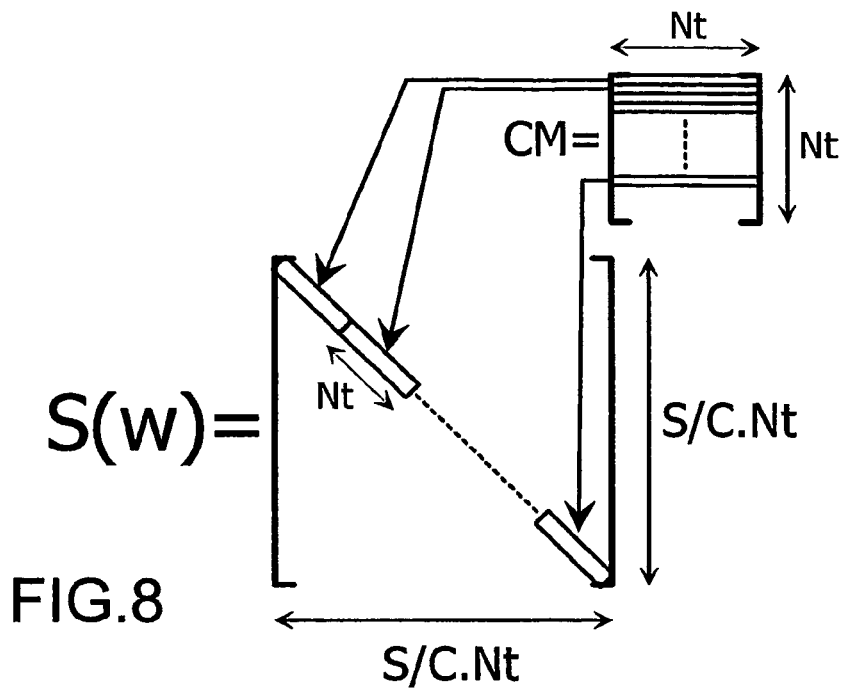
FIGS. 8 and 9 are diagrams showing how a spreading matrix adapted to block-fading communication channels may be constructed.
Figure 9:
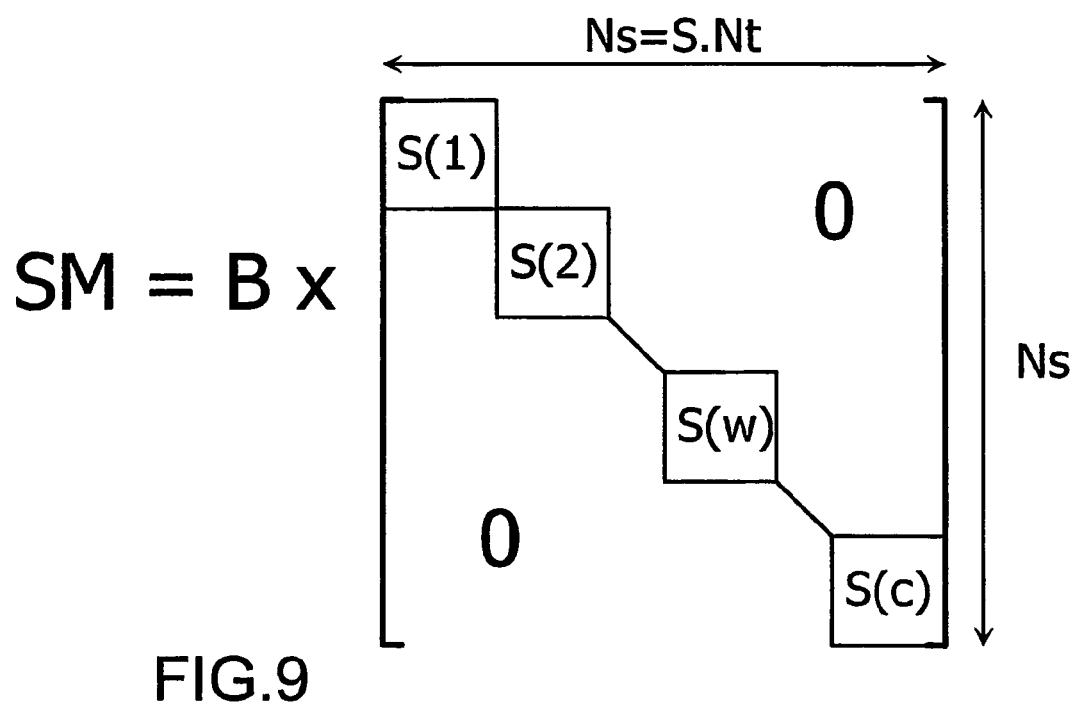

FIGS. 8 and 9 illustrate how a spreading matrix SM according to this third variant of the above-described preferred embodiment of the invention may be constructed.

In a first stage shown in FIG. 8, C sub-matrices S(w) (for w=1 to C) are constructed by selecting a square cyclotomic rotation matrix CM of dimensions Nt×Nt, with Nt greater than or equal to S/C, and selecting S/C rows of matrix CM for constituting S/C successive diagonal chunks of length Nt intended to form a diagonal of each sub-matrix S(W), all such diagonal chunks thus having a same norm and being orthogonal to each other.

Each component $CM_{m,l}$ of the cyclotomic matrix CM may be expressed as:

$$CM_{m,l} = \exp\left(2j\pi \cdot m \cdot \left(\frac{1}{\Phi^{-1}(2 \cdot Nt)} + \frac{l}{Nt}\right)\right),$$

where $\Phi$ represents an Euler function.

In a second stage shown in FIG. 9, the spreading matrix SM is then obtained by multiplying a matrix of dimension Ns×Ns formed by a diagonal array of such sub-matrices S(w) (for w=1 to C) with another cyclotomic rotation matrix B of dimensions Ns×Ns, whose components are given by:

$$B_{p,r} = \exp\left(2j\pi \cdot p \cdot \left(\frac{1}{\Phi^{-1}(2 \cdot Ns)} + \frac{r}{Ns}\right)\right).$$

A spreading matrix SM constructed as explained above will additionally have the properties of a rotation matrix, i.e. such a spreading matrix will be constituted by rows orthogonal to each other and having a same norm, which may be expressed as SM×SM$^H$=I, where I is the identity matrix of rank Ns×Ns and SM$^H$ is a transposed conjugate of matrix SM.

The use of a rotation matrix for computing the plurality of linear combinations of components of successive symbols at the transmitter end enables to optimize global performance of the iterative space-time decoder intended to process said symbols at the receiver end, by enhancing the performance of the first iterative step performed by said decoder.

It should be understood that, in alternative embodiments corresponding to situations in which the components Zij (for i=1 to S and j=1 to Nt) of the symbol vector Z are formed by complex symbols and the spreading matrix SM is of size (2.Ns)×(2.Ns) and includes only real components, the chunks described hereinbefore will each have a size corresponding to twice the number Nt of transmitting antennas.

The invention claimed is:

1. A method for transmitting data in a telecommunication system including at least one transmitter each provided with at least two transmitting antennas and at least one receiver each provided with at least one receiving antenna, the method comprising:
producing, at the at least one transmitter, symbols configured to be transmitted over communication channels established between the at least two transmitting antennas and the at least one receiving antenna; and
spreading components of a predetermined number of successive symbols of the produced symbols over time at the at least one transmitter before transmitting the spread components over said communication channels, wherein the spreading step comprises computing a plurality of linear combinations of components of a vector representative of said successive symbols having each a number of components equal to a number of the at least two transmitting antennas, said plurality of linear combinations configured to be transmitted by the at least two transmitting antennas over a number of time chips equal to the predetermined number of successive symbols, the plurality of linear combinations being obtained by multiplying a vector formed by a concatenation of components of each of said successive symbols, with a predefined spreading matrix, the spreading matrix being constructed such that each of its rows is formed by at least one vector including a plurality of successive chunks each having a size corresponding to the number of the at least two transmitting antennas, all of the successive chunks of any given row having all the same norm.

2. The method as claimed in claim 1, wherein the spreading matrix is constructed such that all of the successive chunks of any given row have all the same norm and are orthogonal to each other.

3. The method as claimed in claim 1, wherein the spreading matrix is constructed such that each row has at least two vectors including each a plurality of successive chunks, said at least two vectors having the same norm.

4. The method as claimed in claim 1, wherein the spreading matrix is a rotation matrix.

5. A telecommunication system, comprising:
at least one transmitter each provided with at least two transmitting antennas; and
at least one receiver each provided with at least one receiving antenna, wherein
the at least one transmitter includes
a symbol encoding unit configured to produce symbols configured to be transmitted over communication channels established between the at least two transmitting antennas and the at least one receiving antenna; and
a symbol spreading unit configured to spread over time components of a predetermined number of successive symbols having each a number of produced components equal to a number of the at least two transmitting antennas before transmission of the spread components over said communication channels, and compute a plurality of linear combinations of components of a vector representative of said successive symbols, said plurality of linear combinations configured to be transmitted by the at least two transmitting antennas over a number of time chips equal to the predetermined number of successive symbols, the plurality of linear combinations being obtained by multiplying a vector formed by a concatenation of components of each of said successive symbols with a predefined spreading matrix, the spreading matrix being constructed such that each of its rows is formed by at least one vector including a plurality of successive chunks each having a size corresponding to the number of the at least two transmitting antennas, all of the successive chunks of any given row having all the same norm.

6. A communication device, comprising:
at least two transmitting antennas;
a symbol encoding unit configured to produce symbols configured to be transmitted over said at least two transmitting antennas; and
a symbol spreading unit configured to spread over time components of a predetermined number of successive symbols having each a number of produced components equal to a number of the at least two transmitting antennas before transmission of the spread components over communication channels, and compute a plurality of linear combinations of components of a vector representative of said successive symbols, said plurality of linear combinations configured to be transmitted by the at least two transmitting antennas over a number of time chips equal to the predetermined number of successive symbols, the plurality of linear combinations being obtained by multiplying a vector formed by a concatenation of components of each of said successive symbols with a predefined spreading matrix, the spreading matrix being constructed such that each of its rows is formed by at least one vector including a plurality of successive chunks each having a size corresponding to the number of the at least two transmitting antennas, all of the successive chunks of any given row having all the same norm.

7. The telecommunication system as claimed in claim 5, wherein the spreading matrix is constructed such that all of the successive chunks of any given row have all the same norm and are orthogonal to each other.

8. The telecommunication system as claimed in claim 5, wherein each row has at least two vectors including each a plurality of successive chunks, said at least two vectors having the same norm.

9. The telecommunication system as claimed in claim 5, wherein the spreading matrix is a rotation matrix.

10. The communication device as claimed in claim 6, wherein the spreading matrix is constructed such that all of the successive chunks of any given row have all the same norm and are orthogonal to each other.

11. The communication device as claimed in claimed 6, wherein each row has at least two vectors including each a plurality of successive chunks, said at least two vectors having the same norm.

12. The communication device as claimed in claim 6, wherein the spreading matrix is a rotation matrix.

* * * * *